United States Patent [19]

Lecoeur et al.

[11] 3,940,523

[45] Feb. 24, 1976

[54] DECORATIVE MULTILAYER OBJECT

[75] Inventors: Georges Lecoeur, Thiers; Henri Fontenille, Paris, both of France

[73] Assignee: Bercher S.A. Publicite Generale, Geneva, Switzerland

[22] Filed: May 31, 1974

[21] Appl. No.: 475,245

Related U.S. Application Data

[63] Continuation-in-part of Ser. No. 249,854, May 3, 1972, abandoned, Continuation-in-part of Ser. No. 249,854, May 3, 1972, abandoned.

[52] U.S. Cl. ....................... 428/38; 156/63; 156/90; 156/100; 156/278; 428/46; 428/48; 428/79; 428/142; 428/147; 428/172; 428/203; 428/327; 428/483; 428/520

[51] Int. Cl.$^2$. B32B 3/18; B32B 31/10; B32B 31/12

[58] Field of Search ........ 117/45; 156/63, 100, 278, 156/90; 161/1, 3, 5, 6, 36–40, 145, 146, 164, 237, 254; 260/885; 428/38, 46, 48, 79, 142, 147, 172, 203, 327, 483, 520

[56] References Cited

UNITED STATES PATENTS

| | | | |
|---|---|---|---|
| 340,485 | 4/1886 | Caspar | 161/40 |
| 1,952,310 | 3/1934 | Carstein | 161/6 |
| 2,877,205 | 3/1959 | Lal | 260/885 |
| 2,994,150 | 8/1961 | Navarre | 156/100 |
| 3,382,134 | 5/1968 | Powell | 161/5 |
| 3,414,642 | 12/1968 | Baum | 161/5 |
| 3,509,002 | 4/1970 | Edwards et al. | 161/6 |
| 3,787,280 | 1/1974 | Conger et al. | 161/5 |

FOREIGN PATENTS OR APPLICATIONS

| | | | |
|---|---|---|---|
| 504,905 | 5/1939 | United Kingdom | 161/3 |

*Primary Examiner*—George F. Lesmes
*Assistant Examiner*—Charles E. Lipsey
*Attorney, Agent, or Firm*—Wenderoth, Lind & Ponack

[57] ABSTRACT

A decorative object comprising an acrylic glass support plate and differently colored polymethyl methacrylate layers and zones thereupon, on one or both major surfaces of the plate, differently colored zones and vertically superposed layers of polymethyl methacrylate being separated from each other and from the support plate by barrier elements and layers respectively which are optically and mechanically compatible with but completely insoluble in and unpenetrable by polymethyl methacrylate.

15 Claims, 3 Drawing Figures

DECORATIVE MULTILAYER OBJECT

This is a continuation-in-part application of application Ser. No. 249,854, filed May 3, 1972, now abandoned.

SUMMARY OF THE INVENTION

The invention relates to decorative objects for artistic use or for advertising purposes which are multilayer structures having an acrylic glass plate support.

Decorative colored glass panels, employing synthetic materials such as acrylic glass to replace conventional glass, have been known for many years. For such panels, methyl methacrylate based products are generally used. In the prior art, the sought-for decorative effects were produced by applying over one or both faces of a support panel of ordinary or acrylic glass, superimposed layers containing coloring pigments, diluted in a composition of the same chemical nature, so as to ensure incorporation or impregnation thereof in the object. The coloring effects were thus obtained by the distribution and/or the superimposition of colored or non-colored layers. In practice, these successive layers were applied in the form of a polymerisable solution using scraper blades or brushes. With a view to solidification and final hardening, known polymerisation catalysts were added. Up to the present time, methyl methacrylate based compositions in the form of acrylic-based colored pastes were used to provide the successive layers with corresponding coloring effects. It has however been observed that the distinctness of the shapes thus obtained was not always fully satisfactory. In particular, a more or less pronounced dispersion or "flashing" of certain colors is frequently encountered in the mass of the object, which caused mixing of the colors. This phenomenon is extremely disadvantageous in certain cases, for example when advertising or artistic layouts or patterns had to be reproduced with precision, for example for the accurate reproduction of printed script.

Furthermore, since advertising panels for outdoor and indoor use are most often constantly illuminated by lamps positioned behind the panels, in order to give them the desired attractive luminosity, the panels will heat to temperatures of the order of 40° to 50°C and sometimes more. In this case which is generally the normal one for luminescent advertising panels, it has been found that superposed and adjacent layers or zones of different colors migrate after a relatively short time one into the other thus producing most undesirable mixing effects which deteriorate rapidly the whole panel.

It has already been known from U.S. Pat. No. 3,509,002, published Apr. 28, 1970, to improve the color stability of laminar constructions and to prevent migration between a lamina of polymethyl methacrylate and a reinforcing lamina which may also consist of polymethyl methacrylic, during the manufacturing process, by an interposed barrier layer comprising cellulose nitrate, nylon, ammoniated methyl methacrylate-glycidyl methacrylate copolymers, plasticized polyvinyl butyral polymers, polyvinyl chloride, acrylic lacquer or an acrylic sheet.

However, this barrier layer is only effective during the manufacturing of the laminar construction and fails completely when such constructions are in use at more or less elevated temperature and during illumination.

Furthemore, such barriers are often not perfectly transparent or become cloudy and brittle.

For example, it is well known that plasticisers are liable to temperature induced migration, and that cellulose nitrate discolors rapidly.

It is therefore an object of the present invention to provide a laminar construction for decorative, artistic and advertising purposes free from these drawbacks.

A further object is to provide such a laminar construction giving a splendid, clear and luminous color appearance when seen in incident and in particular in traversing illumination.

Still a further object of the invention is a simple, rapid and economic method for the manufacture of a laminar construction having the characteristics mentioned above, wherein all compositions employed are hardenable under normal conditions and in reasonable times, without need for heating, pressing, molding, etc.

These above objects are accomplished according to the present invention by the improvement consisting in employing, in combination, horizontal heterogeneous barriers between adjacent differently colored polymethyl methacrylate zones, and vertical homogeneous barriers between superimposed polymethyl methacrylate laminae.

The horizontal heterogeneous barriers comprise strips or similar elements made of polyesters. These barrier elements may be applied in the form of cut-out pieces from polyester sheets like Mylar or Scotchcal. Mylar is a trademark for a high durable film of polyethylene terephthalate resin. The film may be used in transparent, uncolored form, or it may be colored or even opaque, as desired for special effects to be obtained. On the other hand, the horizontal barrier elements may be produced in situ by applying to the polymethyl methacrylate base plate a pattern of a liquid composition comprising an unsaturated polyester, a cross-linking agent and a catalyst, optionally also an accelerator, and the pattern is cured in situ.

Such curable or crosslinking polyester compositions are well known in the art. Polyesters obtained by the reaction of maleic acid or anhydride, propylene glycol or ethylene glycol, and phthalic anhydride are highly satisfactory as the unsaturated polyester component. This component is currently used together with styrene as a cross-linking agent, and with benzoyl peroxide as a catalyst and cobalt naphthenate as an accelerator.

It has been further found that the adherence of this curable polyester composition to the transparent polymethyl methacrylate base plate — which may be colored or not — may considerably be improved if monomeric or prepolymerized methyl methacrylate is added to the liquid, uncured polyester composition. Generally, an addition of from 0.5 to 30% by weight of monomeric methyl methacrylate, based on the total weight of the composition, preferably 1.5 to 10%, is highly satisfactory. It has been found that, during cross-linking and copolymerization, the composition is firmly bound to the base plate.

If preformed polyester elements cut from sheet material are used, they must firmly be compounded with the base plate. Although conventional adhesives may be used, it has been found that such preformed polyester elements, e.g. Mylar strips, are perfectly well fixed to the substrate and give perfect adherence to further laminae if a special curable adhesive is used, developed for this purpose, consisting of a solution of polymethyl methacryalte in a mixture of monomeric methyl methacrylate and a methacrylate cross-linking agent; this adhesive containing also a catalyst. Examples of cross-linking agents for this purpose are ethylene glycol dimethacrylate, 1,3-propylene glycol dimethacrylate, 1,2-propylene glycol dimethacrylate, glycerol dimethacrylate and glycerol trimethacrylate and their mixtures. This special adhesive is rapidly curable to an invisible, flexible, transparent and colorless composition being perfectly compatible with polyester and polymethyl methacrylate. A typical adhesive of the invention contains, by weight, 2 to 8% of ethylene glycol dimethacrylate, 10 to 20% of polymethyl methacrylate, 0.5% of an equal mixture of benzoyl peroxide and dibutylphthalate, the remainder being substantially monomeric methyl methacrylate. Such adhesives present the major advantage to be completely free from any remaining solvent. Furthermore, since the cured adhesive is no longer soluble in monomeric methyl methacrylate, it cannot be attached by further layers containing that monomer. The adhesive cures spontaneously at temperatures between 15° and 40°C, preferably at room temperature during 5 to 24 hours, preferably over night.

The preformed polyester or the in situ cured polyester horizontal barrier elements are preferably completely embedded into said adhesive composition of the invention.

When the polyester elements are fixed on the base plate, the interstices or interspatial zones between these barrier elements are filled with a liquid polymerizable acrylic composition intended to give pattern areas which may be colored or not. This liquid polymerizable acrylic composition comprises polymeric methyl methacrylate dissolved in monomeric methyl methacrylate and a catalyst and may further contain soluble dyestuffs or dispersable pigments. This type of composition is commercialized, e.g. under the trade name "Altufix P 10" by Altulor, Paris, France, having a polymer content of about 10% by weight. This composition also hardens at 15° to 40°C during 5 to 24 hours, preferably overnight at room temperature.

After the polymerization in situ of this filling composition, if such one is employed (which is preferably the case), a vertical barrier layer is applied. This barrier layer of the invention which effectively prevents the age or heat induced migration and interpenetration of vertically adjacent polymethyl methacrylate layers or laminae consists of a cross-linked, transparent, generally uncolored acrylic composition comprising, as a solution in monomeric methyl methacrylate, a polymethyl methacrylate and a cross-linking polyfunctional methacrylic acid ester like those cited above. In other words, this vertical barrier layer has substantially the same composition as the curable adhesive of the invention. This vertical-barrier layer is curable in the same manner as the adhesive composition, i.e., at room temperature and during 10 to 24 hours.

It should specially be noticed that all compositions employed in the practice of the invention are solvent-free, exempt of plasticizers and are curable to perfectly homogeneous layers which are invisible if they do not contain a desired dyestuff or pigment.

After the hardening of the vertical-barrier layer, one more acrylic layer may be applied, as a continuous layer, colored or not, or as a pattern, and so on.

In order to confer a radiating attractive and striking luminosity and a frosty appearance to the panel, irregularly shaped gravel-like bodies, coarse fragments, or grains of transparent, optionally colored polymethyl methacrylate may be fixed on and partly embedded into the uppermost barrier layer. These bodies are then brushed or sprayed with the adhesive composition of the invention for full fixation to the article, thus providing a final coating.

Long-time tests have shown that the horizontal-barrier and vertical-barrier elements and coatings, respectively, efficiently separate the colored polymethyl methacrylate zones and layers. No migration of these zones and layers which would have been detected by color migration, takes place.

The inventive idea should be emphasized here. This idea was to separate all polymethyl methacrylate layers and zones from another and from the base plate by inert, insoluble and compatible elements or layers which contain no solvent and which do not adversely affect the mechanical and optical stability of the finished object. The invention permits the perfect realization of this idea.

The object of the invention may be made for being viewed by direct observation in the manner of a painting, or by transparency in the manner of stained glass window.

The "direct" observation, a non-transparent composition or lamina may further be applied to the backside surface of the base plate. For this purpose, it is convenient to apply a layer of the curable adhesive of the invention, containing a black pigment like carbon black, or another pigment like $TiO_2$, ZnO etc., on the rear surface of the plate and to cure the adhesive layer. Alternatively, an opaque Mylar sheet may be fixed to the rear surface using such curable adhesive, or even a metal foil.

For observation by transparency, no continuous opaque layer is applied. For special effects, the rear surace of the base plate may be provided with one or more of the elements and layers mentioned above, the gravel-like bodies included.

The thickness of the different layers and elements may be varied within relative large limits, depending principally on the kind of object to be manufactured. Typically, for an advertising panel, the thicknesses are about the following: Base plate, 2 to 40 mm; adhesive and vertical-barrier layers, 0.05 to 2 mm; horizontal barrier strips or elements, 0.05 to 4 mm; gravel-like bodies, 1 to 25 mm; final coating, 0.02 to 2 mm.

BRIEF DESCRIPTION OF THE DRAWINGS

The present invention will now be more fully understood from the following description made in conjunction with the accompanying drawings which are as follows.

DETAILED DESCRIPTION OF THE INVENTION

Figure 1:
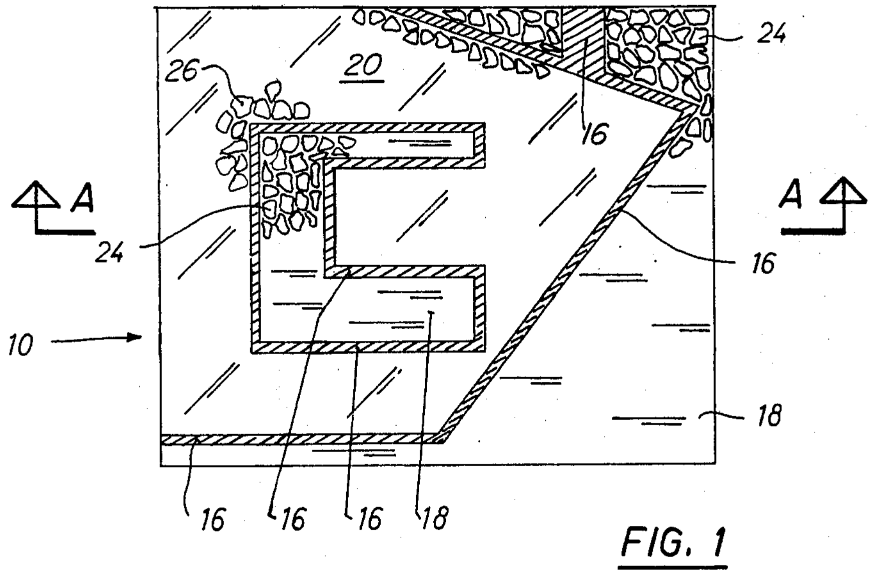
FIG. 1 is a top view on a multilayer advertsing object made in accordance with the present invention.
Figure 2:
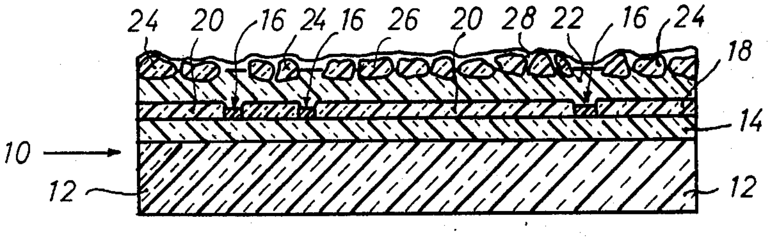
FIG. 2 is an enlarged, cross-sectional view of the object of FIG. 1, taken along the lines A—A in FIG. 1.

Referring now first to FIGS. 1 and 2, the decorative object is designated generally 10. On a base plate 12 made of colorless and transparent acrylic glass, i.e., from polymethyl methacrylate, there is applied a continuous layer 14 of a cured adhesive on the base of cross-linked polymethyl methacrylate as described in the Examples. This layer 14 is the first vertical-barrier layer. This adhesive layer holds in place small strips of Mylar 16 cut from a 1 mm thick black and opaque Mylar sheet. The interspaces between strips 16 are filled with colored and polymerized methyl methacrylate layers 18 and 20 of different colors, as to be described later. These layers are about 1.5 mms thick. The strips 16 from the horizontal-barrier elements. A further continuous vertical-barrier and adhesive layer 22, being transparent and therefore not visible in FIG. 1, covers the strips 16 and the zones 18 and 20. Embedded into this adhesive layer 22 are colored gravel-like bodies 24, 26 of polymethyl methacrylate, having a particle size between about 2 and 4 mms. Bodies 24 have the same color as the zones 18 whereas bodies 26 have the same color as the zones 20. In FIG. 1, some bodies have been omitted for sake of clarity, but in practice, the whole surface of the object with the exception of the regions on top of the strips 16, is covered with a "layer" of said gravel-like bodies.

A final adhesive coating 28, transparent and invisible, is applied on the top of the gravel-like bodies 24 and 26.

Figure 3:
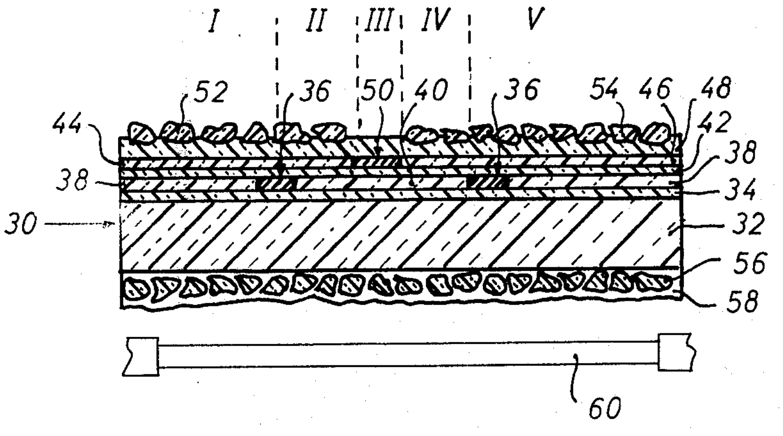
FIG. 3 is an enlarged, cross-sectional view of a second embodiment of the invention.

According to FIG. 3 showing another embodiment of the invention, the object which is generally designated 30, includes a base plate 32 formed of colorless, transparent polymethyl methacrylate. This plate 32 bears a first vertical-barrier continuous layer 34 of colorless transparent cross-linked polymethyl methacrylate. Horizontal-barrier elements 36 of an unsaturated polyester composition containing methyl methacrylate and $TiO_2$ as a white pigment and which have been hardened in situ, are fixed to the vertical-barrier layer 34. The zones between the elements 36 are filled with differently colored polymethyl methacrylate layers 38, 40. Layers 38 are white whereas layer 40 is blue. A second continuous vertical-barrier layer 42, colorless and transparent, is placed on the top of layers 38 and 40 and elements 36. Second colored layers 44, 46 which are separated by a second horizontal-barrier element 50, are provided on the surface of vertical-barrier layer 42. Layer 44 is yellow whereas layer 46 is blue. A final vertical-barrier layer 48 which holds in place colored and transparent gravellike bodies 52 (yellow) and 54 (blue) constitutes the final layer.

The rear side of the plate 32 comprises colorless, transparent gravel-like bodies 56 held in place by the adhesive layer 58.

When illuminated by the radiation tube 60 from behind, the panel shows a strikingly luminous image giving the following color impressions.

Zone I: yellow
Zone II: green
Zone III: blue
Zone IV: dark blue
Zone V: blue

The following examples which are not to be construed as limiting the invention in any way since it is capable of other embodiments and of being carried out in other ways, further illustrate the invention. In these Examples, amounts and percentages are given by weight.

EXAMPLE I

This Example illustrates the manufacture of the embodiment according to FIGS. 1 and 2.

On a clear, colorless, transparent base plate made from polymethyl methacrylate, 100 × 100 × 2 cm, is poured 100 ml of a viscous liquid composition (A) consisting, by weight, of 85% monomeric methyl methacrylate, 10% of polymethyl methacrylate, 5% of ethylene glycol dimethacrylate, 0.5% of glycerol trimethacrylate and 1.5% of benzoyl peroxide. All components are dissolved in the methyl methacrylate. After curing at 21°C for 8.5 hours, a 1 mm thick, invisible layer has been formed which is insoluble in liquid methyl methacrylate.

The pattern of FIG. 1, formed from 2.5 mm large strips cut from a 1 mm thick black Mylar sheet, is now placed on the substrate and fixed by brushing with the adhesive composition described above. Curing is effective as described, and into the interspatials between the Mylar strips, liquid acrylic compositions (B) are poured in a height of about 1 mm. These compositions consist each of 4% of a soluble dyestuff, 10% of polymethyl methacrylate, 1% of benzoyl peroxide and 85% of monomeric methyl methacrylate.

After curing overnight at 20°C, 200 ml of the composition (A) above are poured onto the hardened polymethyl methacrylate zones and the Mylar strips. When this coating is just gelling, after about 80 minutes, colored gravel-like bodies made by crushing from transparent colored polymethyl methacrylate cuttings and have a particle size of about 3 to 8 mm, are spread over the gelling layer and gently pushed into it. After curing overnight at 20°C, all bodies are firmly bonded into the adhesive and barrier layer which has now a thickness of about 2 mm. It should be noticed that the gravellike bodies may have the same color as the underneath zones of polymethyl methacrylate, or they may be uniformly colored or colorless.

A final protective coating is applied by spraying 40 ml of composition (A) onto the gravel-like bodies and curing it overnight at 20°–22°C. This coating is invisible.

EXAMPLE II

This example illustrates the manufacture of the embodiment according to FIG. 3.

Composition A (adhesive and vertical-barrier):

| Compound | parts by weight |
|---|---|
| Monomeric methyl methacrylate | 90 |
| Polymethyl methacrylate | 10 |
| Ethylene glycol dimethacrylate | 5 |

A solution is made up from these components, and shortly before use, 5 parts of a stabilized catalyst (benzoyl peroxide dissolved in dibutyl phthalate, weight ratio 1:2) are added with stirring.

Composition B (horizontal-barrier)

| Compound | parts by weight |
|---|---|
| Polyester from maleic acid and propylene glycol | 75 |
| Styrene | 25 |
| Monomeric methyl methacrylate | 18 |
| Benzoyl peroxide (catalyst) | 1 |
| Cobalt naphthenate (accelerator) | 0.008 *) |
| $TiO_2$ | 20 |

*) calculated as metallic cobalt (The catalyst and accelerator are added shortly before use)

Composition C (filling)

| Compound | parts by weight |
|---|---|
| Monomeric methyl methacrylate | 90 |
| Polymethyl methacrylate | 10 |
| Catalyst (benzoyl peroxide) added shortly before use | 2 |
| Pigment color (as desired) | 10 |

In general this procedure is substantially the same as in Example I, with the following exceptions:

On the first vertical-barrier layer made from composition A, traces of composition B are applied by brushing; these traces are about 0.5 mm thick and have the desired width, e.g. about 2 to 3 mm. These "strips" are cured at 20°–22°C overnight and are then firmly bonded to the first vertical-barrier layer. Composition C is applied in an amount of 50 ml/m$^2$ giving a thickness of about 0.5 mm.

In Example I, one colored filling layer has been applied. In this Example, two such layers are used, and these layers are separated by a further intermediate vertical-barrier layer having a thickness of about 0.5 mm.

Furthermore, the rear surface of the base plate is covered with a layer of composition A in which during its gelling gravel-like bodies of crushed colorless polymethyl methacrylate are fixed (see Example I).

The objects of the invention are particularly useful for all artistic and advertising purposes. Patterns and images of luminosity, clearness, durability and color separation which have been unknown hitherto, are obtained.

What we claim is:

1. A decorative object comprising
- a. a transparent support plate of polymethyl methacrylate, bearing at least on one surface,
- b. at least one decorative layer of polymethyl methacrylate coated on said support and consisting of horizontally separated zones of different colors,
- c. at least two transparent colorless vertical-barrier layer coatings of a cross-linked polymethyl methacrylate based composition, insoluble in monomeric and polymeric methyl methacrylate, the first layer being disposed between said support and said decorative layer and the second layer on the upper surface of said decorative layer, and
- d. horizontal-barrier elements consisting of strips cut from thermoplastic polyester sheets, said elements being fixed to said support plate by said first vertical-barrier layer and separating said horizontally adjacent differently colored zones of said decorative layer.

2. The decorative object of claim 1, further comprising gravel-like bodies of crushed transparent polymethyl methacrylate fixed to and in part into said second vertical-barrier layer.

3. The decorative object of claim 2, further comprising a thin protective coating of a transparent cross-linked polymethyl methacrylate based composition applied to the upper surfaces of said gravel-like bodies.

4. The decorative object of claim 1, further comprising gravel-like bodies of crushed transparent polymethyl methacrylate fixed to and in part into said second vertical-barrier layer, said gravel-like bodies being colored and the color of said bodies being substantially the same as the color of the respective zone of the decorative layer beneath these bodies.

5. The decorative object of claim 1, further comprising gravel-like bodies of crushed transparent polymethyl methacrylate fixed to and in part into said second vertical-barrier layer, the zones above said horizontal-barrier elements being free from said gravel-like bodies.

6. The decorative object of claim 1, wherein said strips are of an opaque polyester.

7. The decorative object of claim 1, wherein said transparent colorless vertical-barrier layers comprise polymethyl methacrylate cross-linked by a minor proportion of a polyfunctional methacrylic acid ester.

8. The decorative object of claim 7, wherein said polyfunctional methacrylic acid ester is selected from ethylene glycol dimethacrylate, a propylene glycol dimethacrylate, glycerol dimethacrylate or glycerol trimethacrylate.

9. The decorative object of claim 1, further comprising another transparent colorless vertical-barrier layer on the rear surface of said support plate.

10. The decorative object of claim 9, further comprising gravel-like bodies of crushed transparent polymethyl methacrylate fixed to and in part into said barrier layer on the rear surface of said support plate.

11. A decorative object comprising
- a. a transparent support plate of polymethyl methacrylate, bearing at least on one surface
- b. a first decorative layer of polymethyl methacrylate coated on said support and consisting of horizontally separated zones of different colors,
- c. at least two transparent colorless vertical barrier layer coatings of a cross-linked polymethyl methacrylate based composition, insoluble in monomeric and polymeric methyl methacrylate, the first layer being disposed between said support and said first decorative layer and the second layer on the upper surface of said first decorative layer,
- d. horizontal-barrier elements consisting of strips cut from thermoplastic polyester sheets, said elements being fixed to said support plate by said first vertical-barrier and separating said horizontally different colored zones of said decorative layer,
- e. a second decorative layer having horizontally adjacent zones of different colors coated on said second transparent colorless vertical-barrier layer which color zones are separated from each other by horizontal barrier elements consisting of strips cut from thermoplastic sheets fixed to said second transparent colorless vertical-barrier layer,
- f. a third transparent colorless vertical-barrier layer coated on the upper surface of said second decorative layer and horizontal-barrier elements, said layer being a cross-linked polymethyl methacrylate based composition insoluble in monomeric and polymeric methyl methacrylate.

12. A method for manufacturing a decorative object, comprising the steps of
- a. providing a biplanar transparent support plate of polymethyl methacrylate,
- b. pouring thereon a solvent free liquid composition comprising monomeric methyl methacrylate with polymethyl methacrylate dissolved therein, a polyfunctional ester of methacyrlic acid, and a catlayst,
- c. curing said liquid composition at a temperature in the range of 15° to 40°C during 5 to 24 hours,
- d. placing on the surface of the cured liquid composition strips cut from a thin thermoplastic polyester sheet, e. fixing said strips by brushing with said liquid composition, and curing it, f. filling the horizontal spatial zones between said strips with a decorative composition comprising a solvent-free monomeric methyl methacrylate with polymethyl methacrylate dissolved therein, a catalyst and, if desired, a dyestuff or pigment, g. hardening said decorative composition at a termperature in the range of 15° to 40°C during 5 to 24 hours, h. pouring another liquid composition as in step (b) onto said hardened decorative composition, and i. curing this composition.

13. The method of claim 12, further comprising the steps of applying onto said liquid composition of step (h) a layer of gravel-like irregularly shaped bodies of transparent, crushed polymethyl methacrylate, pressing same slightly into said liquid composition, and curing said liquid composition.

14. The method of claim 13, further comprising the steps of brushing or spraying onto said gravel-like bodies a thin layer of said liquid composition, and curing this composition.

15. The method of claim 12, further comprising repeating steps (d) to (i) at least once.

* * * * *